United States Patent
Nakamoto

(10) Patent No.: US 9,949,463 B2
(45) Date of Patent: Apr. 24, 2018

(54) BUBBLE ELECTROLYZED WATER GENERATION APPARATUS AND AUTOMATIC WASHING APPARATUS

(71) Applicant: TECH CORPORATION CO., LTD, Hiroshima (JP)

(72) Inventor: Yoshinori Nakamoto, Hiroshima (JP)

(73) Assignee: TECH CORPORATION CO., LTD., Hiroshima (JP)

( * ) Notice: Subject to any disclaimer, the term of this patent is extended or adjusted under 35 U.S.C. 154(b) by 233 days.

(21) Appl. No.: 14/425,532

(22) PCT Filed: Oct. 10, 2014

(86) PCT No.: PCT/JP2014/005181
§ 371 (c)(1),
(2) Date: Mar. 3, 2015

(87) PCT Pub. No.: WO2015/075861
PCT Pub. Date: May 28, 2015

(65) Prior Publication Data
US 2016/0029602 A1    Feb. 4, 2016

(30) Foreign Application Priority Data
Nov. 22, 2013    (JP) .................. 2013-242416

(51) Int. Cl.
*C02F 1/461* (2006.01)
*A01K 43/00* (2006.01)
(Continued)

(52) U.S. Cl.
CPC ............ *A01K 43/005* (2013.01); *A23L 3/358* (2013.01); *A23L 15/00* (2016.08); *C02F 1/4618* (2013.01);
(Continued)

(58) Field of Classification Search
CPC .................. A61L 2/035; A01K 43/005; C02F 2001/46185; C02F 2001/4619;
(Continued)

(56) References Cited

U.S. PATENT DOCUMENTS 4,190,505 A * 2/1980 Ogawa ...................... C25B 1/46
                                                    205/536
4,744,956 A * 5/1988 Yant ...................... B01J 19/2465
                                                    261/76
(Continued)

FOREIGN PATENT DOCUMENTS

EP    2 857 360    4/2015
JP    7-236886    9/1995
(Continued)

OTHER PUBLICATIONS

Extended European Search Report dated Apr. 20, 2016 in European patent application No. 14838907.5.

*Primary Examiner* — David G Cormier
(74) *Attorney, Agent, or Firm* — Wenderoth, Lind & Ponack, L.L.P.

(57) ABSTRACT

An automatic washing apparatus (1) includes: an electrolyzed water generation unit (8) that electrolyzes raw water to which an electrolyte is added to thereby generate electrolyzed water; a bubble generation unit (9) that allows fine bubbles to be contained in the electrolyzed water with use of a generated gas generated in the electrolyzed water generation unit (8) to thereby generate bubble electrolyzed water; a washing unit (4) that discharges the bubble electrolyzed water to a washing object to wash the washing object; and a control unit (2) that controls a discharge timing and discharge amount of the bubble electrolyzed water.

5 Claims, 3 Drawing Sheets

CONFIGURATION OF BUBBLE ELECTROLYZED WATER

(51) Int. Cl.
*C25B 1/04* (2006.01)
*A23L 3/358* (2006.01)
*C25B 15/00* (2006.01)
*A23L 15/00* (2016.01)
*B08B 3/02* (2006.01)
*C02F 1/20* (2006.01)
*B60S 3/00* (2006.01)
*C02F 3/20* (2006.01)

(52) U.S. Cl.
CPC ............... *C25B 1/04* (2013.01); *C25B 15/00* (2013.01); *A23V 2002/00* (2013.01); *B08B 3/02* (2013.01); *B60S 3/00* (2013.01); *C02F 1/20* (2013.01); *C02F 3/202* (2013.01); *C02F 2001/4619* (2013.01); *Y02E 60/366* (2013.01); *Y02W 10/15* (2015.05)

(58) Field of Classification Search
CPC .......... C02F 2001/46195; C02F 1/4618; C02F 1/20; A23L 3/358; C25B 1/04; C25B 15/00
See application file for complete search history.

(56) References Cited

U.S. PATENT DOCUMENTS 5,824,200 A    10/1998  Kitajima et al.

2006/0054205 A1    3/2006   Yabe et al.
2015/0125344 A1    5/2015   Kanno

FOREIGN PATENT DOCUMENTS

| | | |
|---|---|---|
| JP | 7-299461 | 11/1995 |
| JP | 9-308885 | 12/1997 |
| JP | 10-296198 | 11/1998 |
| JP | 2000-14269 | 1/2000 |
| JP | 2000-107760 | 4/2000 |
| JP | 2004-121962 | 4/2004 |
| JP | 2005-193159 | 7/2005 |
| JP | 2007-209546 | 8/2007 |
| JP | 2009-178710 | 8/2009 |
| JP | 2009-268997 | 11/2009 |
| JP | 4563496 | 10/2010 |
| JP | 2011-217785 | 11/2011 |
| JP | 2012-96203 | 5/2012 |
| JP | 2013-10758 | 1/2013 |
| JP | 2013-17963 | 1/2013 |
| JP | 5238899 B1 * | 7/2013 ........... A23L 3/3454 |
| KR | 2010-0108016 | 10/2010 |
| WO | 2007/004274 | 1/2007 |
| WO | 2013/175800 | 11/2013 |

* cited by examiner

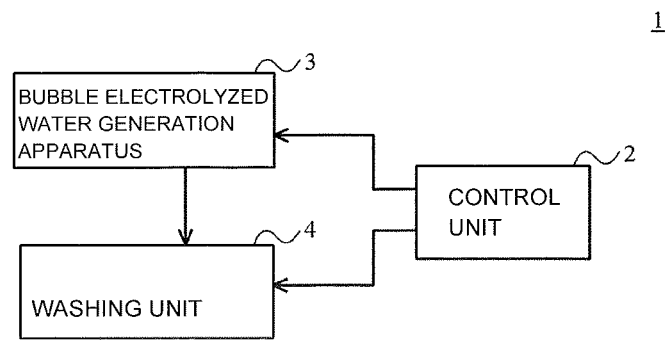
FIG. 1: CONFIGURATION OF AUTOMATIC WASHING APPARATUS
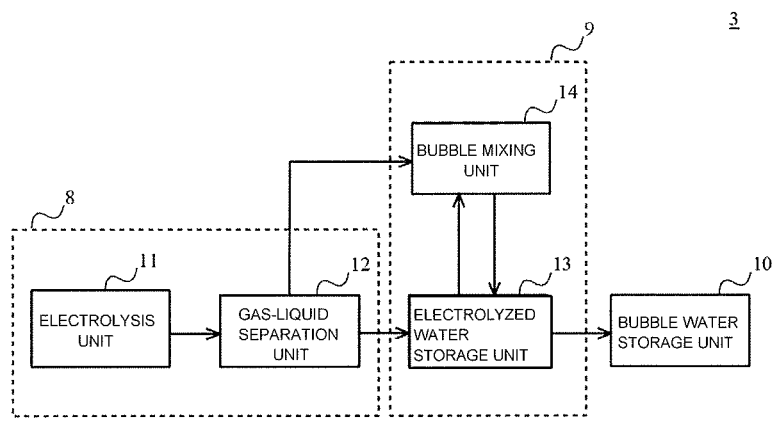
FIG. 2: CONFIGURATION OF BUBBLE ELECTROLYZED WATER

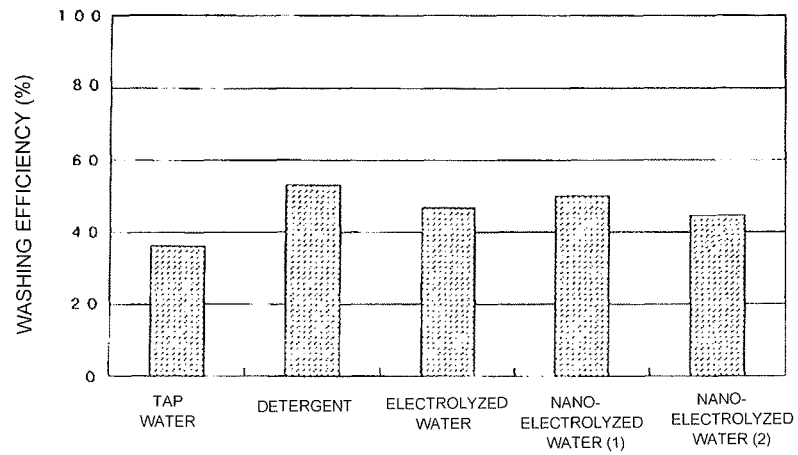
FIG. 3: WASHING RESULTS OF CARBON BLACK/MINERAL OIL-SOILED FABRICS
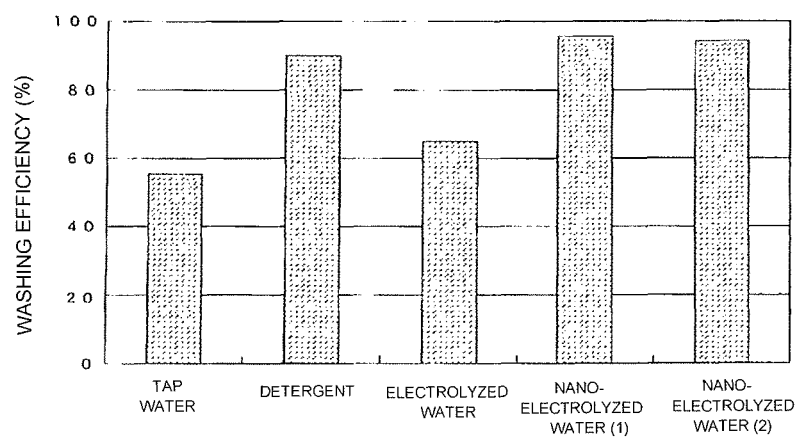
FIG. 4: WASHING RESULTS OF BLOOD-SOILED FABRICS

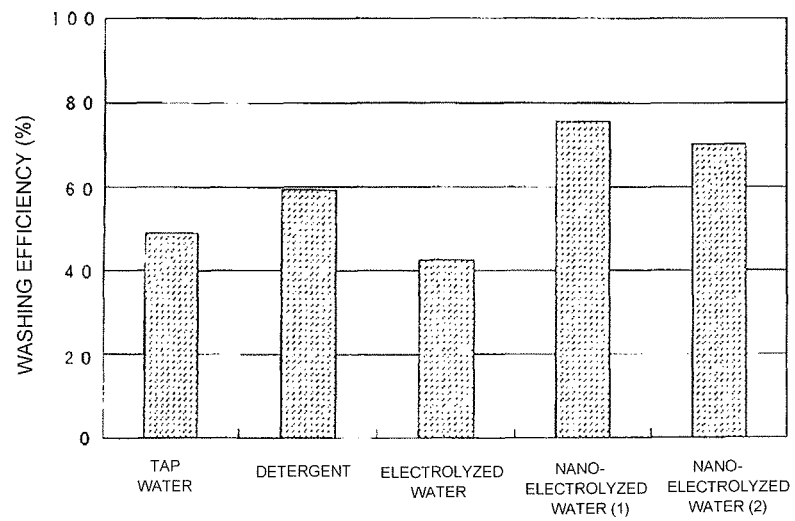
FIG. 5: WASHING RESULTS OF COCOA-SOILED FABRICS
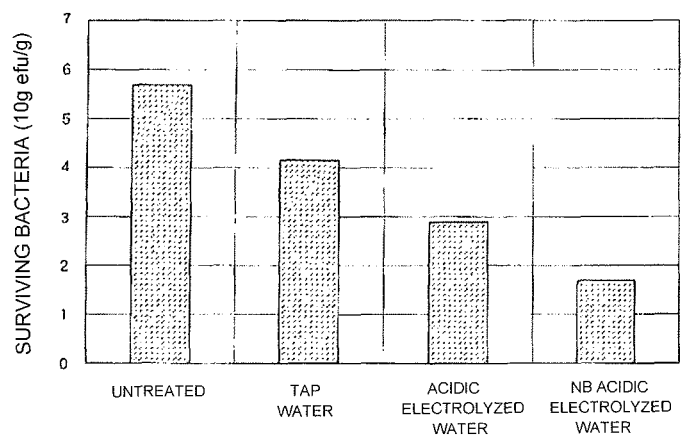
FIG. 6: STERILIZATION EFFECTS OF BOSTON LETTUCE

BUBBLE ELECTROLYZED WATER GENERATION APPARATUS AND AUTOMATIC WASHING APPARATUS

TECHNICAL FIELD

The present invention relates to an automatic washing apparatus that washes various washing objects such as cars, industrial components, clothes, tableware, and food, and an electrolyzed water generation apparatus that is used in the automatic washing apparatus.

BACKGROUND ART

Conventionally, electrolyzed water generation apparatuses are widely used in the fields of washing and the like (for example, see Patent Literature 1).

It is known that when this electrolyzed water is used, washing power equal to or higher than that obtained when surfactants are used can be obtained even without using the surfactants.

On the other hand, water (hereinafter, referred to as bubble water) that contains fine bubbles including nanometer-order bubbles (nanobubbles) is widely known.

The bubble water enters fine asperities to exert the effect of isolating dirt, and is used in the fields of washing, cleaning, and the like (for example, see Patent Literature 2).

CITATION LIST

Patent Literature

Patent Literature 1: Japanese Patent Application Laid-Open No. 2009-268997

Patent Literature 2: Japanese Patent No. 4563496

SUMMARY OF INVENTION

Technical Problem

Bubble water is usually generated with use of air. By allowing nanobubbles to be contained into electrolyzed water so as to generate bubble electrolyzed water, synergistic effects between the electrolyzed water and the nanobubbles can be expected to further increase effects such as washing power.

However, while allowing nanobubbles to be contained into electrolyzed water, air causes neutralization reaction. Thus, there has been a problem that the effect as bubble electrolyzed water decreases.

The present invention has been made to solve such a problem, and an object thereof is to provide an electrolyzed water generation apparatus that can improve the effect as bubble electrolyzed water, and an automatic washing apparatus employing the bubble electrolyzed water.

Solution to Problem

To solve such a problem, the bubble electrolyzed water generation apparatus according to the present invention is configured to include: an electrolyzed water generation unit that electrolyzes raw water to which an electrolyte is added to thereby generate electrolyzed water; a gas-liquid separation unit that separates from the electrolyzed water a generated gas that is generated in the electrolyzed water generation unit; and a bubble generation unit that allows fine bubbles to be contained in the electrolyzed water with use of the generated gas separated by the gas-liquid separation unit to thereby generate bubble electrolyzed water.

Thus, the bubble electrolyzed water generation apparatus mixes the generated gas into the electrolyzed water. Accordingly, neutralization reaction to be caused during mixing decreases, so that fine bubbles can be allowed to be contained into the electrolyzed water while the effect as electrolyzed water hardly decreases.

Also, the automatic washing apparatus according to the present invention is configured to include: an electrolyzed water generation unit that electrolyzes raw water to which an electrolyte is added to thereby generate electrolyzed water; a gas-liquid separation unit that separates from the electrolyzed water a generated gas that is generated in the electrolyzed water generation unit; a bubble generation unit that allows fine bubbles to be contained in the electrolyzed water with use of the generated gas separated by the gas-liquid separation unit to thereby generate bubble electrolyzed water; a washing unit that discharges the bubble electrolyzed water to a washing object to wash the washing object; and a control unit that controls a discharge timing and a discharge amount of the bubble electrolyzed water.

Accordingly, in the automatic washing apparatus, neutralization reaction to be caused during mixing can be reduced by mixing the generated gas into the electrolyzed water, and a washing object can be automatically washed by means of the highly effective electrolyzed water.

Advantageous Effects of Invention

The present invention mixes the generated gas into the electrolyzed water. Accordingly, neutralization reaction to be caused during mixing decreases, so that fine bubbles can be allowed to be contained into the electrolyzed water while the effect as electrolyzed water hardly decreases. Thus, the effect as electrolyzed water can be improved.

According to the present invention, neutralization reaction to be caused during mixing can be decreased by mixing the generated gas into the electrolyzed water, and the washing object can be washed with the highly effective electrolyzed water. Thus, washing effect can be improved.

BRIEF DESCRIPTION OF DRAWINGS

FIG. 1 is a schematic line diagram illustrating a configuration of an automatic washing apparatus.

FIG. 2 is a schematic line diagram illustrating a configuration of a bubble electrolyzed water generation apparatus.

FIG. 3 is a graph illustrating washing results of carbon black/mineral oil-soiled fabrics.

FIG. 4 is a graph illustrating washing results of blood-soiled fabrics.

FIG. 5 is a graph illustrating washing results of cocoa-soiled fabrics.

FIG. 6 is a graph illustrating sterilization effects of Boston lettuce.

DESCRIPTION OF EMBODIMENTS

Hereinafter, embodiments for carrying out the present invention will be described with reference to the drawings.

Embodiments

1. Configuration of Automatic Washing Apparatus

In the present embodiments, sodium chloride (NaCl) is used as an electrolyte, and tap water is used as raw water. This is a suitable example, and the present invention is not limited to this example.

Other examples of raw water to be used may include various adjusted waters such as tap water subjected to softened water treatment, mineral water, purified water, an aqueous hydrochloric acid solution, and an aqueous sodium hydroxide solution. Examples of an electrolyte to be used may include various substances that dissolve in water to be ionized, such as sodium hypochlorite, sodium hydrogen carbonate, hydrochloric acid, and potassium carbonate.

FIG. 1 illustrates an automatic washing apparatus 1 as a whole, which is assumed to wash various washing objects.

The automatic washing apparatus 1 is composed of a control unit 2, an electrolyzed water generation apparatus 3 and a washing unit 4.

The control unit 2 centrally unifies and controls the electrolyzed water generation apparatus 3 and the washing unit 4.

The electrolyzed water generation apparatus 3 generates electrolyzed water (hereinafter, referred to as bubble electrolyzed water) containing nanometer-order bubbles, and supplies the washing unit 4 with the generated electrolyzed water.

Examples of the washing unit 4 to be assumed include a jet-type washer and a washing gun both having a jet outlet through which the bubble electrolyzed water is ejected toward a washing object, and a storage-type washing machine and a storage-type cleaning machine both storing the bubble electrolyzed water for washing with a water flow.

The control unit 2 monitors the use amount of the bubble electrolyzed water in the washing unit 4 and at least one of the storage amount and the generation amount of the bubble electrolyzed water in the bubble electrolyzed water generation apparatus 3, and controls the generation amount of the bubble electrolyzed water in the bubble electrolyzed water generation apparatus 3.

As illustrated in FIG. 2, the electrolyzed water generation apparatus 3 is composed of an electrolyzed water generation unit 8, a bubble water generation unit 9, and a bubble water storage unit 10. An electrolysis unit 11 of the electrolyzed water generation unit 8 includes a three-tank electrolytic cell that contains a cathode chamber having a cathode electrode, an anode chamber having an anode electrode, and an intermediate chamber disposed between the cathode chamber and the anode chamber through a diaphragm. The configuration of the electrolytic cell is not limited, and any electrolytic cell having an optional configuration, such as a single-tank electrolytic cell or a double-tank electrolytic cell, can be used.

When the electrolysis unit 11 is supplied with tap water as raw water and an aqueous sodium chloride solution as an electrolyte, the electrolysis unit 11 generates an alkaline electrolyzed water and an acidic electrolyzed water, and supplies a gas-liquid separation unit 12 with the generated alkaline electrolyzed water and acidic electrolyzed water. At this time, the alkaline electrolyzed water contains hydrogen gas, and the acidic electrolyzed water contains chlorine gas and ozone gas. These gases are generated at the respective electrodes.

The gas-liquid separation unit 12 pools the alkaline electrolyzed water and the acidic electrolyzed water each containing the generated gas, and separates the gas-containing water into gas and liquid. It is noted that the electrolysis unit 11 and the gas-liquid separation unit 12 preferably have a hermetically sealed structure. The gas-liquid separation unit 12 may simply allow the pooled electrolyzed water to be left to stand, or may rapidly perform gas-liquid separation by agitation or the like.

The gas-liquid separation unit 12 supplies a bubble mixing unit 14 with a generated gas that is the separated gas (i.e., hydrogen gas, and chlorine gas and ozone gas). Also, the gas-liquid separation unit 12 supplies an electrolyzed water storage unit 13 with the separated electrolyzed water that is the separated liquid (i.e., the alkaline electrolyzed water and the acidic electrolyzed water).

The electrolyzed water storage unit 13 stores the separated electrolyzed water, and supplies the bubble mixing unit 14 with the stored, separated electrolyzed water. As a result, the bubble mixing unit 14 is supplied with the electrolyzed water (hereinafter, referred to as a stored electrolyzed water) stored in the electrolyzed water storage unit 13 from the electrolyzed water storage unit 13, and with the generated gas from the gas-liquid separation unit 12.

The bubble mixing unit 14 mixes the stored electrolyzed water and the generated gas while allowing them to revolve at high speed, so that nanobubbles containing nano-order bubbles are allowed to be contained in the stored electrolyzed water. Then, the bubble mixing unit 14 returns the resultant mixture to the electrolyzed water storage unit 13. It is noted that the bubble mixing unit 14 has two revolving tanks where hydrogen gas is mixed with the alkaline electrolyzed water, and chlorine gas and ozone gas are mixed with the acidic electrolyzed water. The configuration of these revolving tanks is described in, for example, Patent Literature 2. The electrolyzed water storage unit 13 supplies the bubble water storage unit 10 with the stored electrolyzed water at a predetermined rate.

Here, for example, it is assumed that the supply amount of the separated electrolyzed water supplied from the gas-liquid separation unit 12 and the supply amount of the stored electrolyzed water supplied to the bubble water storage unit 10 are each 5 L/min, and the supply amount of the stored electrolyzed water supplied to the bubble mixing unit 14 is 20 L/min. It is noted that these supply amounts of the electrolyzed water can be freely set by varying the opening areas of valves in pipe arrangement or varying the operating rates of pumps.

In this case, the stored electrolyzed water is supplied to the bubble mixing unit 14 four times on average before being supplied to the bubble water storage unit 10 to thereby allow bubbles to be contained therein.

Also, when it is assumed that the supply amount of the stored electrolyzed water supplied to the bubble water storage unit 10 is 2.5 L/min while the other conditions are not changed, the stored electrolyzed water is supplied to the bubble mixing unit 14 eight times on average before being supplied to the bubble water storage unit 10 to thereby allow bubbles to be contained therein.

For example, when chlorine gas is mixed with the acidic electrolyzed water, part of chlorine gas remains as nanobubbles in the acidic electrolyzed water, while a majority of chlorine gas separates from the acidic electrolyzed water. At this time, part of the separated chlorine gas dissolves in the acidic electrolyzed water.

When air is used as nanobubbles, supplying the revolving tank with the acidic electrolyzed water multiple times in order to increase the content of nanobubbles causes the dissolved chlorine in the acidic electrolyzed water to vaporize due to neutralization reaction and high-speed revolution. As a result, the effect as the acidic electrolyzed water is reduced.

However, mixing chlorine gas with the acidic electrolyzed water rather increases the concentration of the dissolved chlorine in the acidic electrolyzed water. Therefore, the content of nanobubbles can be increased while improving the effect as the acidic electrolyzed water. It is noted that when the increased content of the dissolved chlorine is not desired, chlorine gas and air can be mixed to adjust the concentration of chlorine gas. The same applies to ozone gas.

The same applies to the alkaline electrolyzed water. That is, mixing hydrogen gas with the alkaline electrolyzed water increases the content of nanobubbles while improving the effect as the alkaline electrolyzed water.

In this manner, the bubble electrolyzed water generation apparatus 3 can mix the electrolyzed water and the generated gas multiple times by adjusting the supply amount of the stored electrolyzed water supplied to the bubble mixing unit 14 and the supply amount of the stored electrolyzed water supplied to the bubble water storage unit 10. As a result, the bubble electrolyzed water generation apparatus 2 can vary the content of nanobubbles while maintaining or improving the effect as the electrolyzed water.

The stored electrolyzed water generated in this manner is configured to be stored as the bubble electrolyzed water in the bubble water storage unit 10.

It is noted that in the above-described embodiments, the bubble electrolyzed water generation apparatus 3 is configured to generate both the alkaline bubble electrolyzed water and the acidic bubble electrolyzed water. The present invention is not limited to this, and may be configured to generate at least one of the alkaline bubble electrolyzed water and the acidic bubble electrolyzed water. For example, the bubble electrolyzed water generation apparatus 3 may be configured to generate only one of the alkaline electrolyzed water and the acidic electrolyzed water, so that the bubble electrolyzed water is generated with use of any one of hydrogen gas, and chlorine gas and ozone gas.

Also, both the alkaline electrolyzed water and the acidic electrolyzed water may be mixed, and one of the generated gases may be mixed to the mixed electrolyzed water to generate the bubble electrolyzed water. In brief, the bubble electrolyzed water generation apparatus 3 may generate at least one bubble electrolyzed water.

2. Example of Automatic Washing Apparatus

Next, the case where the washing object is a car will be described.

A popular gate-type car washing machine includes a movable brush disposed so as to come into contact with an outside (a side surface and an upper surface) of a car, as well as a water ejection port through which water is ejected and an air ejection port through which air is ejected both disposed in the vicinity of the movable brush. That is, a gate-type washing zone is formed in three directions of both lateral sides and an upper side, and is configured to move from a front side to a back side of a car.

In the car washing machine, this washing zone moves to a front side and a back side multiple times for washing a car. Usually, in the car washing machine, the washing zone moves once while the movable brush being in contact with a car revolves and vibrates for operation, and detergent water is ejected from the water ejection port. After that, the washing zone moves at least once for performing rinsing and drying in which the movable brush comes in non-contact with a car, tap water is ejected from the water ejection port, and air is ejected. Thus, the washing zone moves along the length of a car at least twice.

To this car washing machine, the bubble electrolyzed water generation apparatus 3 and the control unit 2 according to the invention of the present application are connected.

That is, the car washing machine acts as the washing unit 4, and the control unit 2 is integrated with the bubble electrolyzed water generation apparatus 3. Naturally, the car washing machine may also have the function of the control unit 2. Also, the control unit 2 may be separately disposed to be stand-alone.

In the bubble electrolyzed water generation apparatus 3, a water softening device that softens raw water is preferably disposed at a stage prior to the electrolysis unit 11. This enables removal of minerals contained in tap water as raw water. Therefore, formation of white spots remained when dried can be significantly reduced.

Also, the bubble electrolyzed water generation apparatus 3 preferably generates only the alkaline bubble electrolyzed water to provide the same to the car washing machine. This is because the acidic bubble electrolyzed water may cause corrosion of metal.

In this case, the car washing machine allows the washing zone to move in one direction while the movable brush being into contact with a car vibrates and rotates for operation, and the alkaline bubble electrolyzed water is ejected from the water ejection port. At this time, the car washing machine ejects air from the air ejection port positioned on a back side with respect to the water ejection port in the moving direction for drying. That is, the car washing machine can finish car washing by allowing the washing zone to move only once along the length of a car, and thus can significantly reduce a time taken for washing a car. It is noted that drying is preferably performed by the air system in which air blows water away. However, heat may be added thereto.

Also, the use of the bubble electrolyzed water generation apparatus 3 in the car washing machine allows the alkaline bubble electrolyzed water to be used in place of washing water, thereby enabling exertion of washing effects equal to or larger than those of the washing water. Furthermore, the alkaline bubble electrolyzed water does not contain surfactants and hardly causes formation of spots. Therefore, rinsing becomes unnecessary, enabling the use amount of electricity and water in the car washing machine to significantly decrease. Certainly, even when the alkaline bubble electrolyzed water is used, the car washing machine may be configured to allow the washing zone to move along the length of a car twice or more in order to improve washing effects.

Next, the case where the washing object is an egg will be described.

Usually, substances such as feathers and feces of chickens, egg shells, dirt, and dust are attached on eggs. To address this concern, the alkaline bubble electrolyzed water being excellent in removing proteins and oils and fats is firstly used to remove the attached substances, and then the acidic bubble electrolyzed water having sterilization effects is used to perform sterilization treatment.

Therefore, the control unit 2 controls the bubble electrolyzed water generation apparatus 3 and the washing unit 4 so that the alkaline bubble electrolyzed water is ejected to an egg, and then the acidic bubble electrolyzed water is ejected to the egg.

In this case, the washing unit 4 preferably ejects the bubble electrolyzed water in an atomized manner. The bubble electrolyzed water has decreased surface tension due to the effects by nanobubbles, and thus can enter concaves and convexes on an egg shell. For this reason, washing and sterilization effects are higher than those of a commonly-used electrolyzed water.

Certainly, an ejection port may be provided for each of the alkaline bubble electrolyzed water and the acidic bubble electrolyzed water, and eggs may be conveyed on a conveyor belt or the like. In this case, the control unit 2 controls timings of ejecting the alkaline bubble electrolyzed water and the acidic bubble electrolyzed water in concordance with the positions of the eggs on the conveyor belt.

Next, the case where the washing object is a vegetable will be described.

For a vegetable, the acidic bubble electrolyzed water is used. The washing unit 4 may be a washing tank that stores the acidic bubble electrolyzed water, or a washing apparatus that sprays the acidic bubble electrolyzed water over vegetables. In the case of a washing tank, the acidic bubble electrolyzed water is preferably additionally poured when in use so as to overflow. In the case of spraying, the acidic bubble electrolyzed water may be sprayed from one or a plurality of fixed ejection ports, or the periphery of a vegetable may be washed by moving something having an ejection port disposed on the tip of a hose, like a washing gun. Either the whole vegetable or cut vegetables can be applied as a vegetable.

Next, the case where the washing object is an industrial component will be described.

When washing a metal precision industrial component, the type of the bubble electrolyzed water to be used varies depending on the type and properties of metal, the type and properties of a component, usage, and the like. For example, when a component is covered with an oxide film, or when a metal film on the surface is desired to be removed, the acidic bubble electrolyzed water is used. On the other hand, when oxidation is desired to be inhibited, the alkaline bubble electrolyzed water is used. According to some dirty conditions, the two types can be used in respective different manners. The washing unit 4 may be a washing tank that stores the bubble electrolyzed water, or a washing apparatus that sprays the bubble electrolyzed water.

The control unit 2 controls the bubble electrolyzed water generation apparatus 3 and the washing unit 4 so that the acidic bubble electrolyzed water and the alkaline bubble electrolyzed water are discharged with a predetermined order, time and discharge amount depending on the washing object. Then, the control unit 2 controls the bubble electrolyzed water generation apparatus 3 so that the bubble electrolyzed water is generated according to the use amounts of the acidic bubble electrolyzed water and the alkaline bubble electrolyzed water or the remaining amount in the bubble water storage unit 10.

Examples of an assumed washing object other than these include windows of buildings, airplanes, and ships. In airplanes and ships, the acidic bubble electrolyzed water is preferably used in order to inhibit corrosion of metal like those used for cars. In windows of buildings, either the acidic or alkaline bubble electrolyzed water can be used, but it is preferred to appropriately select either one depending on the type of wall materials around glass, or the like.

3. Effects of Bubble Electrolyzed Water

3-1. Experiment by Washing

Next, effects of washing power when using the bubble electrolyzed water according to the invention of the present application will be reviewed.

Contents of Test:

An artificially soiled fabric (manufactured by EMPA) was washed with the bubble electrolyzed water, and washing efficiency was calculated. Water used for washing is tap water, detergent, electrolyzed water, nano-electrolyzed water 1, or nano-electrolyzed water 2.

The "detergent" used was a synthetic detergent for washing (Attack Bio EX, manufactured by Kao Corporation). Otherwise, washing was performed without a detergent. The nano-electrolyzed water 1 is bubble electrolyzed water generated with use of the generated gas, and the nano-electrolyzed water 2 is bubble electrolyzed water generated with use of air.

The nano-electrolyzed water 1 was generated by mixing the generated gas into the electrolyzed water again (0.2 L/min).

The nano-electrolyzed water 2 was generated by mixing air into the electrolyzed water (0.2 L/min).

Test Method:

Each of 15 cm square artificially soiled fabrics (non-soiled fabric, carbon black/mineral oil, blood, and cocoa) was sewn to a towel (64 cm in width×27 cm in length), and washing was performed according to the following processes.

It is noted that the water level was set at "low," and washing was performed together with nine bath towels, in order to reproduce rubbing among the laundries in a tank. The water temperature was 6 to 8° C.

A. Tap water and detergent
 1. Washing: 15 minutes, 1 minute of temporal spin-drying (only when a detergent is used: 60 g of a detergent poured)
 2. Rinsing 1: 10 minutes, 1 minute of temporal spin-drying
 3. Rinsing 2: 15 minutes
 4. Spin-drying: 15 minutes B. Electrolyzed water
 1. Washing with alkaline electrolyzed water: 15 minutes, 1 minute of temporal spin-drying
   pH 10.80, ORP-192
 2. Washing with acidic electrolyzed water: 10 minutes, 1 minute of temporal spin-drying
   pH 4.05, chlorine concentration: 19 ppm
 3. Rinsing: 3 minutes
 4. Spin-drying: 5 minutes C. Nano-electrolyzed water 1
 1. Washing with bubble alkaline electrolyze water: 15 minutes, 1 minute of temporal spin-drying
   pH 12.17, ORP-596
 2. Washing with bubble acidic electrolyzed water: 10 minutes, 1 minute of temporal spin-drying
   pH 4.41, chlorine concentration: 18 ppm
 3. Rinsing: 3 minutes
 4. Spin-drying: 5 minutes D. Nano-electrolyzed water 2
 1. Washing with bubble alkaline electrolyzed water: 15 minutes, 1 minute of temporal spin-drying
   pH 12.17, ORP-202
 2. Washing with bubble acidic electrolyzed water: 10 minutes, 1 minute of temporal spin-drying
   pH 4.40, chlorine concentration: 18 ppm
 3. Rinsing: 3 minutes
 4. Spin-drying: 5 minutes Used Equipment:

Spectrophotometer CM-600d (manufactured by Konica Minolta Sensing, Inc.)

Portable electric conductivity and pH meter WM-32EP (manufactured by DKK-TOA Corporation)

ORP composite electrode PST-2739C (manufactured by DKK-TOA Corporation)

Chlorine concentration meter RC-2Z (manufactured by Kasahara Chemical Instruments Corp.)

Business-use laundry machine 22 kg-type WN220 (manufactured by Yamamoto Co Ltd.)

Measurement and Calculation Method:

After washing, reflectivity at 520 nm was measured using a spectrophotometer, and a K/S value and washing efficiency (%) were calculated according to the formula below:

$$K/S \text{ value} = \{1 - \text{reflectivity}\}^2/2/\text{reflectivity}$$

Washing efficiency (%)={(K/S of washed fabric)−(K/S of washed soiled fabric}/{(K/S of soiled fabric)−(K/S of non-soiled fabric)}×100.

As illustrated in FIGS. 3 to 5, the washing power of the nano-electrolyzed water 1 including the generated gas was equal to or higher than that when a detergent is used, and was also higher compared with that of the nano-electrolyzed water 2 including air.

From the above, the use of the generated gas was confirmed to improve washing effects as the bubble electrolyzed water.

3-2. Experiment of Sterilizing Power

Contents of Test:

The bubble electrolyzed water according to the invention of the present application was used. Three leaves were randomly extracted from (commercially available) Boston lettuce, and each leaf was divided into four to be used as a specimen. The amount of the specimen was approximately 8 g. The specimen was lightly washed with water, and then was washed with running test water for 2 minutes. After washing, the specimen was lightly washed with water.

The specimen was put in a sterilized bag, and a tenfold diluted solution was added. Then, the solution was homogenized for one minute. One milliliter of the resultant specimen solution was dispensed on simple culture mediums, and subjected to serial dilution by a pour method. Incubation was performed in an incubator at 35° C. for 48 hours. Then, the number of bacteria was counted, and an average value for three leaves was measured.

Test Water:

Tap water

Acidic electrolyzed water: pH 3.01 remaining free chlorine concentration: 40 ppm Bubble acidic electrolyzed water: pH 3.05 remaining free chlorine concentration: 40 ppm As illustrated in FIG. 6, the number of bacteria in the bubble acidic electrolyzed water was the lowest, and the sterilization effects thereof was confirmed to be significantly high compared with tap water and a conventional acidic electrolyzed water.

4. Operation and Effect

According to the above configuration, the bubble electrolyzed water generation apparatus 3 according to the invention of the present application is configured to include: the electrolyzed water generation unit 8 that electrolyzes raw water to which an aqueous electrolyte solution is added as an electrolyte to thereby generate electrolyzed water; and the bubble generation unit 9 that allows fine bubbles to be contained in the electrolyzed water with use of a generated gas generated in the electrolyzed water generation unit 8 to thereby generate bubble electrolyzed water.

Accordingly, in the bubble electrolyzed water generation apparatus 3, the generated gas that is an active ingredient as electrolyzed water is mixed into the electrolyzed water. Therefore, the effect as electrolyzed water can be inhibited from decreasing, compared with the case where air is mixed for allowing fine bubbles to be contained therein.

The bubble electrolyzed water generation apparatus 3 includes the bubble water storage unit 10 that stores the bubble electrolyzed water generated by the bubble generation unit 9. Accordingly, the bubble electrolyzed water generation apparatus 3 can supply the bubble electrolyzed water in an amount according to a user's requirement without keeping the user waiting, even when the bubble electrolyzed water generation rate is not considerably high.

The bubble generation unit 9 generates at least one of the alkaline bubble electrolyzed water with use of the alkaline electrolyzed water and hydrogen gas, and the acidic bubble electrolyzed water with use of the acidic electrolyzed water and chlorine gas.

The alkaline bubble electrolyzed water increases the washing power to proteins or oils and fats as well as has reducing action, and is thus significantly effective in being used as washing water. The acidic bubble electrolyzed water has sterilizing power, deodorizing and bleaching power, and oxidation effects, and is thus significantly effective in being used as water for washing and sterilization. Both bubble electrolyzed waters can be used singly or in combination, and improve washing efficiency.

The bubble generation unit 9 mixes the electrolyzed water and the generated gas multiple times to allow fine bubbles to be contained in the electrolyzed water, thereby enabling the amount of fine bubbles and the effect by the electrolyzed water to increase.

The bubble generation unit 9 includes the electrolyzed water storage unit 13 that stores the electrolyzed water, and the bubble mixing unit 14 that mixes the electrolyzed water and the generated gas to allow fine bubbles to be contained in the electrolyzed water. The bubble mixing unit 14 supplies the electrolyzed water storage unit 13 with the electrolyzed water containing fine bubbles. Accordingly, the bubble generation unit 9 can mix the electrolyzed water and the generated gas multiple times to allow fine bubbles to be contained in the electrolyzed water, with a simple configuration.

The amount of the bubble electrolyzed water discharged from the electrolyzed water storage unit 13 to the bubble water storage unit 10 is smaller than the amount of the stored electrolyzed water supplied from the electrolyzed water storage unit 13 to the bubble mixing unit 14. Accordingly, the bubble generation unit 9 can control the frequency of mixing the electrolyzed water and the generated gas, with a simple configuration.

The electrolyzed water generation unit 8 generates electrolyzed water containing a generated gas, and includes the gas-liquid separation unit 12 that separates the generated gas and the electrolyzed water from the electrolyzed water containing the generated gas. Accordingly, the electrolyzed water generation unit 8 can supply the bubble mixing unit 14 with the generated gas that is usually emitted to the air with the simple configuration.

An electric electrolyzed water generation unit 8 mixes the alkaline electrolyzed water and the acidic electrolyzed water both being generated as the electrolyzed water, and generates the alkaline bubble electrolyzed water or the acidic bubble electrolyzed water with use of at least one of the generated gases. Accordingly, the bubble electrolyzed water generation apparatus 3 can generate the bubble electrolyzed water without wasting used raw water.

Also, the automatic washing apparatus 1 is configured to include: the electrolyzed water generation unit 8 that electrolyzes raw water to which an electrolyte is added to thereby generate electrolyzed water; the bubble generation unit 9 that allows fine bubbles to be contained in the electrolyzed water with use of a generated gas generated in the electrolyzed water generation unit 8 to thereby generate bubble electrolyzed water; the washing unit 4 that discharges the bubble electrolyzed water to a washing object to wash the washing object; and the control unit 2 that controls a discharge timing and a discharge amount of the bubble electrolyzed water.

Accordingly, the automatic washing apparatus 1 can control the discharge timing and discharge amount of the bubble electrolyzed water due to the control by the control unit 2. Therefore, the washing apparatus can be automatically controlled.

The electrolyzed water generation unit 8 is configured to generate, as the bubble electrolyzed water, the alkaline bubble electrolyzed water with use of the alkaline electrolyzed water and hydrogen gas, and the acidic bubble electrolyzed water with use of the acidic electrolyzed water and chlorine gas. The control unit 2 is configured to discharge the alkaline bubble electrolyzed water and the acidic bubble electrolyzed water to a washing object in accordance with a previously determined order.

Accordingly, the automatic washing apparatus 1 can use an appropriate combination of those bubble electrolyzed waters depending on each of various washing objects, and can thus improve washing efficiency.

The washing unit 4 is connected to waterworks, and the control unit 2 controls the discharge timing and discharge amount of tap water and the bubble electrolyzed water. Accordingly, the automatic washing apparatus 1 can use tap water in addition to the bubble electrolyzed water, and can thus save a use amount of the bubble electrolyzed water for washing more washing objects.

The bubble water storage unit 10 that stores the bubble electrolyzed water generated by the bubble generation unit 9 is provided. The control unit 2 controls the electrolyzed water generation unit 8 and the bubble generation unit 9 so that the electrolyzed water and the bubble electrolyzed water are generated in accordance with the water storage amount in the bubble water storage unit 10. Accordingly, the automatic washing apparatus 1 can sufficiently and appropriately generate the bubble electrolyzed water in accordance with the consumption amount of the bubble electrolyzed water depending on the washing object.

The bubble electrolyzed water is the alkaline bubble electrolyzed water generated with use of the alkaline electrolyzed water and hydrogen gas, and the washing object is a mobile unit such as cars, ships, and airplanes. Accordingly, the automatic washing apparatus 1 uses the alkaline electrolyzed water having reducing power, and thus can inhibit generation of rust even in a mobile unit in which metal is largely used and rust is likely to be generated.

The washing unit 4 includes a washing zone having: a movable brush attached so as to come into contact and non-contact with a washing object; a water ejection port as an ejection unit through which the bubble electrolyzed water is ejected; an air ejection port as a drying unit that dries off the bubble electrolyzed water; and a movement unit that moves the movable brush, the water ejection port, and the air ejection port. The control unit 2 controls the washing zone to move in one direction while the bubble electrolyzed water is ejected in a state where the movable brush is in contact with the washing object and air is ejected from the air ejection port. The air ejection port is disposed on the other direction side with respect to the movable brush and the water ejection port.

Accordingly, the automatic washing apparatus 1 can finish washing of a washing object only by one movement along the length of the washing object. Thus, the use amount of water and electricity can be significantly reduced, and the environmental load by washing can be reduced.

The automatic washing apparatus 1 has a water softening unit that softens water at a stage prior to the electrolyzed water generation unit 8 to reduce impurities in the bubble electrolyzed water. Therefore, spots are unlikely to be formed, and rinsing becomes unnecessary.

The bubble electrolyzed water is the acidic bubble electrolyzed water generated with use of the acidic electrolyzed water and chlorine gas, and the washing object is food. Accordingly, the automatic washing apparatus 1 can prolong the life of food due to the sterilization effects of the acidic bubble electrolyzed water. Especially, when the acidic bubble electrolyzed water is used to vegetables having been already cut, change in color can be suitably inhibited.

The control unit 2 controls the washing unit 4 so that the alkaline bubble electrolyzed water is ejected to an egg as a washing object, and then the acidic bubble electrolyzed water is ejected to the egg. Accordingly, the automatic washing apparatus 1 can effectively wash and sterilize an egg, and improve the product value of an egg.

Other Embodiments

It is noted that in the above-described embodiments, the bubble mixing unit 14 is configured to use a revolving tank in which air bubbles are allowed to be contained in the electrolyzed water. The present invention is not limited to this, and air bubbles can be allowed to be contained in the electrolyzed water by various methods, such as a method of releasing pressure to allow air bubbles to be contained in the electrolyzed water.

Also, in the above-described embodiments, the bubble electrolyzed water generation apparatus 3 is configured to include the bubble water storage unit 10. The present invention is not limited to this, and the bubble water storage unit 10 is not necessarily essential.

Furthermore, in the above-described embodiments, the bubble electrolyzed water generation apparatus 3 is configured to generate both the alkaline bubble electrolyzed water and the acidic bubble electrolyzed water. The present invention is not limited to this, and the bubble electrolyzed water generation apparatus 3 may be configured to generate at least one of the alkaline bubble electrolyzed water and the acidic bubble electrolyzed water.

Furthermore, in the above-described embodiments, the separated electrolyzed water and the generated gas are configured to be mixed multiple times. The present invention is not limited to this, and the separated electrolyzed water and the bubble electrolyzed water may be configured to have an identical generation rate, so that the separated electrolyzed water and the generated gas are mixed only once. In this case, the electrolyzed water storage unit 13 is not essential, and for example, a hermetically sealed structure may be provided to inhibit the generated gas from leaking out of the electrolysis unit 11, to allow the electrolyzed water to be directly supplied to the bubble mixing unit 14. Also, the frequency of mixing the separated electrolyzed water and the generated gas may be reduced to less than once.

Furthermore, in the above-described embodiments, the generated gas is configured to be chlorine gas, and hydrogen gas and ozone gas. The present invention is not limited to this. The generated gas may depend on the electrolyte, and any gas generated by electrolysis of an aqueous electrolyte solution may be used as the generated gas.

Furthermore, in the above-described embodiments, the electrolyzed water generation unit 8 and the bubble generation unit 9 are configured to constitute the bubble electrolyzed water generation apparatus 3. The present invention is not limited to this, and the bubble electrolyzed water generation apparatus according to the present invention may be constituted by the electrolyzed water generation unit and the bubble generation unit each having other various configurations.

Furthermore, in the above-described embodiments, the electrolyzed water generation unit 8, the bubble generation unit 9, the washing unit 4, and the control unit 2 are configured to constitute the automatic washing apparatus 1. The present invention is not limited to this, and the automatic washing apparatus according to the present invention may be constituted by the electrolyzed water generation unit, the bubble generation unit, the washing unit, and the control unit each having other various configurations.

INDUSTRIAL APPLICABILITY

The present invention can be applied to, for example, an automatic car washing machine and an automatic vegetable washing machine.

REFERENCE SIGNS LIST

1 automatic washing apparatus
2 control unit
3 bubble electrolyzed water generation apparatus
4 washing unit
8 electrolyzed water generation unit
9 bubble generation unit
10 bubble water storage unit
11 electrolysis unit
12 gas-liquid separation unit
13 electrolyzed water storage unit
14 bubble mixing unit

The invention claimed is:

1. A bubble electrolyzed water generation apparatus comprising:
   an electrolytic cell that generates electrolyzed water through electrolyzation of raw water to which an electrolyte is added;
   a gas-liquid separation container that is connected to the electrolytic cell, houses electrolyzed water supplied from the electrolytic cell, and separates gas from the electrolyzed water;
   an electrolyzed water storage container that is connected to the gas-liquid separation container and receives electrolyzed water itself supplied from the gas-liquid separation container, and stores the electrolyzed water; and
   a mixer that is connected to both the gas-liquid separation container and the electrolyzed water storage container; and mixes electrolyzed water supplied from the electrolyzed water storage container and gas supplied from the gas-liquid separation container to generate bubble electrolyzed water with fine bubbles, and supplies the bubble electrolyzed water to the electrolyzed water storage container,
   wherein the electrolyzed water storage container receives the bubble electrolyzed water supplied from the mixer and stores the bubble electrolyzed water.

2. The bubble electrolyzed water generation apparatus according to claim 1, wherein
   the bubble electrolyzed water supplied from the mixer to the electrolyzed water storage container is returned to the mixer, and
   the bubble electrolyzed water moves twice or more between the electrolyzed water storage container and the mixer.

3. The bubble electrolyzed water generation apparatus according to claim 1, comprising a bubble water storage container that is connected to the electrolyzed water storage container and stores bubble electrolyzed water supplied from the electrolyzed water storage container.

4. The bubble electrolyzed water generation apparatus according to claim 3, wherein
   an amount of the bubble electrolyzed water discharged from the electrolyzed water storage container to the bubble water storage container is smaller than an amount of the electrolyzed water supplied from the electrolyzed water storage container to the mixer.

5. The bubble electrolyzed water generation apparatus according to claim 1, wherein
   the bubble electrolyzed water generation apparatus is configured to produce at least one of an alkaline bubble electrolyzed water by using an alkaline electrolyzed water and hydrogen gas in the bubble electrolyzed water generation apparatus and an acidic bubble electrolyzed water by using an acidic electrolyzed water and chlorine gas in the bubble electrolyzed water generation apparatus.

* * * * *